(12) United States Patent
Murray et al.

(10) Patent No.: US 7,744,149 B2
(45) Date of Patent: Jun. 29, 2010

(54) CAB SUSPENSION LINKAGE SYSTEM

(75) Inventors: Tim Murray, Spirit Lake, IA (US);
Casey Steffensen, Jackson, MN (US);
Wayne Ward, Spirit Lake, IA (US)

(73) Assignee: AGCO Corporation, Duluth, GA (US)

( * ) Notice: Subject to any disclaimer, the term of this patent is extended or adjusted under 35 U.S.C. 154(b) by 0 days.

(21) Appl. No.: 12/136,325

(22) Filed: Jun. 10, 2008

(65) Prior Publication Data

US 2009/0302640 A1      Dec. 10, 2009

(51) Int. Cl.
*B62D 33/06* (2006.01)
(52) U.S. Cl. ............... 296/190.07; 296/1.03; 180/89.13
(58) Field of Classification Search ............ 296/190.04, 296/190.07, 190.08, 190.05, 1.03; 180/89.12, 180/89.13
See application file for complete search history.

(56) References Cited

U.S. PATENT DOCUMENTS

| 99,867 | A | * | 2/1870 | Evans | 267/66 |
|---|---|---|---|---|---|
| 4,330,149 | A | * | 5/1982 | Salmon | 296/190.05 |
| 4,452,328 | A | * | 6/1984 | Oudelaar | 180/89.14 |
| 5,553,911 | A | * | 9/1996 | Bodin et al. | 296/190.07 |
| 5,590,733 | A | * | 1/1997 | Ljungholm et al. | 180/89.14 |
| 5,954,149 | A | * | 9/1999 | Williams | 180/89.12 |
| 5,957,231 | A | * | 9/1999 | Conaway et al. | 180/89.14 |
| 6,702,367 | B2 | * | 3/2004 | Leitner et al. | 296/190.07 |
| 6,805,215 | B2 | * | 10/2004 | Puterbaugh | 180/89.13 |
| 6,898,501 | B2 | * | 5/2005 | Schubert | 701/50 |
| 7,232,180 | B2 | * | 6/2007 | Biasiotto et al. | 296/190.07 |
| 2003/0146647 | A1 | * | 8/2003 | Leitner et al. | 296/190.05 |
| 2006/0261639 | A1 | * | 11/2006 | Biasiotto et al. | 296/190.07 |
| 2007/0267894 | A1 | * | 11/2007 | Van Den Brink et al. | 296/190.07 |
| 2007/0278811 | A1 | * | 12/2007 | Derham et al. | 296/35.1 |
| 2008/0258483 | A1 | * | 10/2008 | Weber | 296/1.03 |
| 2009/0085377 | A1 | * | 4/2009 | Hayes et al. | 296/190.07 |

FOREIGN PATENT DOCUMENTS

EP          0273796 A1 *  7/1988

OTHER PUBLICATIONS

Machine Translation of EP0273796.*

* cited by examiner

*Primary Examiner*—Jason S Morrow

(57) ABSTRACT

An agricultural vehicle is described having a chassis and a cab mounted on the chassis. A suspension system for reducing the accelerations transmitted from the vehicles tires or tracks through the frame, into the cab, and ultimately through to the operator is provided. By reducing the accelerations, the ride quality is greatly improved, allowing operators to operate a vehicle for longer periods of time without excessive fatigue.

16 Claims, 4 Drawing Sheets

CAB SUSPENSION LINKAGE SYSTEM

BACKGROUND OF THE INVENTION

1. Field of the Invention

Various aspects of the present invention relate to a suspension system linkage arrangement for an agricultural vehicle having a cab resiliently supported on the chassis of the vehicle.

2. Description of Related Art

The ride quality and operator comfort of a work vehicle is adversely affected by vibrations or movement transmitted from the frame or chassis of the vehicle to the operator's cab. As the cab typically is built separately from, and later mounted on, the frame, and because the cab is separate from the frame, movement of the frame may be transmitted through and amplified by the connections between the cab and the frame.

As the work vehicle travels across a surface, movement of the frame/chassis induces the operator's cab to pitch, roll and bounce. Movement of the cab can be particularly severe in agricultural and construction equipment vehicles (e.g., tractors, combines, backhoes, cranes, dozers, trenchers, skid-steer loaders, etc.), because such vehicles typically operate on off-road surfaces or fields having a high level of bumpiness.

Operator comfort may also be adversely affected by the operation of various systems on a work vehicle. In particular, operation of various work vehicle systems can cause forces to be applied to the chassis of the vehicle which, in turn, are transmitted to the cab. Examples of these forces include: draft forces exerted on the hitch of an agricultural tractor by an implement (e.g., a plow), which can cause the cab to pitch; normal forces applied to a work vehicle as the vehicle turns in response to a steering device, which can cause the cab to roll; clutch forces generated when a work vehicle clutch (e.g., a main drive clutch; four-wheel drive clutch) is engaged or disengaged, which can cause the cab to pitch; gear shift forces generated when a transmission of a work vehicle is shifted, which can cause the cab to pitch; braking forces generated as brakes of a work vehicle are operated, which can cause the cab to pitch; and acceleration forces generated when a speed actuator changes the speed of a work vehicle which can cause the cab to pitch.

The movement of the cab caused by surface bumps and the operation of vehicle systems cause both qualitative and quantitative problems. An operator of such a vehicle experiences increased levels of discomfort and fatigue caused by the vibrations. Productivity is decreased when an operator is forced to rest or shorten the work day, or is unable to efficiently control the work vehicle. The operator is also less likely to be satisfied with a work vehicle that provides poor ride quality. Under certain conditions, the frequency and magnitude of cab movement may force the operator to decrease driving speed, further decreasing productivity.

It is common for the cab, or operator station, to be mounted directly on the chassis and to rely only on springing in the operator's seat to improve operator comfort. This, however, is not entirely satisfactory, and therefore the cab can be supported on rubber mounts that provide an improved degree of cushioning.

Another known suspension system enables the cab to be resiliently mounted on the vehicle chassis. Stabilizer linkages are provided on the tractor fore and aft of the cab to limit the movement of the pivotal connection of the stabilizer linkages to the cab to essentially a vertical movement that lies in a vertical plane including the longitudinal centers of the vehicle chassis and the cab. A sway or yaw limiting mechanism as well as a pitch limiting mechanism are provided to limit the pitch and roll of the cab as it moves through the vertical plane relative to the vehicle chassis.

The present invention improves upon the known cab suspension systems, and thus it is to such a system that the present invention is primarily directed.

BRIEF SUMMARY OF THE INVENTION

Briefly described, a suspension system for reducing the accelerations transmitted from the vehicles tires or tracks through the frame, into the cab, and ultimately through to the operator is provided. By reducing the accelerations, the ride quality is greatly improved, allowing operators to operate a vehicle for longer periods of time without excessive fatigue.

An agricultural vehicle includes a chassis and a cab mounted on the chassis, wherein a suspension system of the vehicle comprises a linkage assembly including a first and second fore-aft linkage, and a lateral linkage. The fore-aft linkages restrain the front of the cab from moving fore-aft and laterally. The linkages enable the cab to move and down, through an arc shape, without restraint. To restrain rotational movement, the rear lateral linkage is provided.

In exemplary embodiments, the linkages are Watts linkages, being a relatively short, double arm lever rotatably mounted, and two relatively long levers extending in opposite directions from the ends of the double arm lever to fixed pivot points. All pivoting points are free to rotate in a vertical plane. It is advantageous for the shorter lever to be vertical and the two longer levers to be substantially horizontal when the vehicle is at rest on a level surface.

The terms "fore", "aft" and "transverse" as used herein are all referenced to the longitudinal centerline of the chassis with the vehicle moving in a forward direction. The term "vertical" refers herein to the direction perpendicular to the forward wheel axle, i.e., the normal to the plane of contact of the wheels with the ground. The terms "pitch", "yaw" and "roll" are likewise referenced to the longitudinal axis of the chassis, roll being rotation of the cab about a longitudinal axis, pitch about a transverse axis and yaw about a vertical axis.

These and other objects, features and advantages of the present invention will become more apparent upon reading the following specification in conjunction with the accompanying drawings.

DETAILED DESCRIPTION

Figure 1:
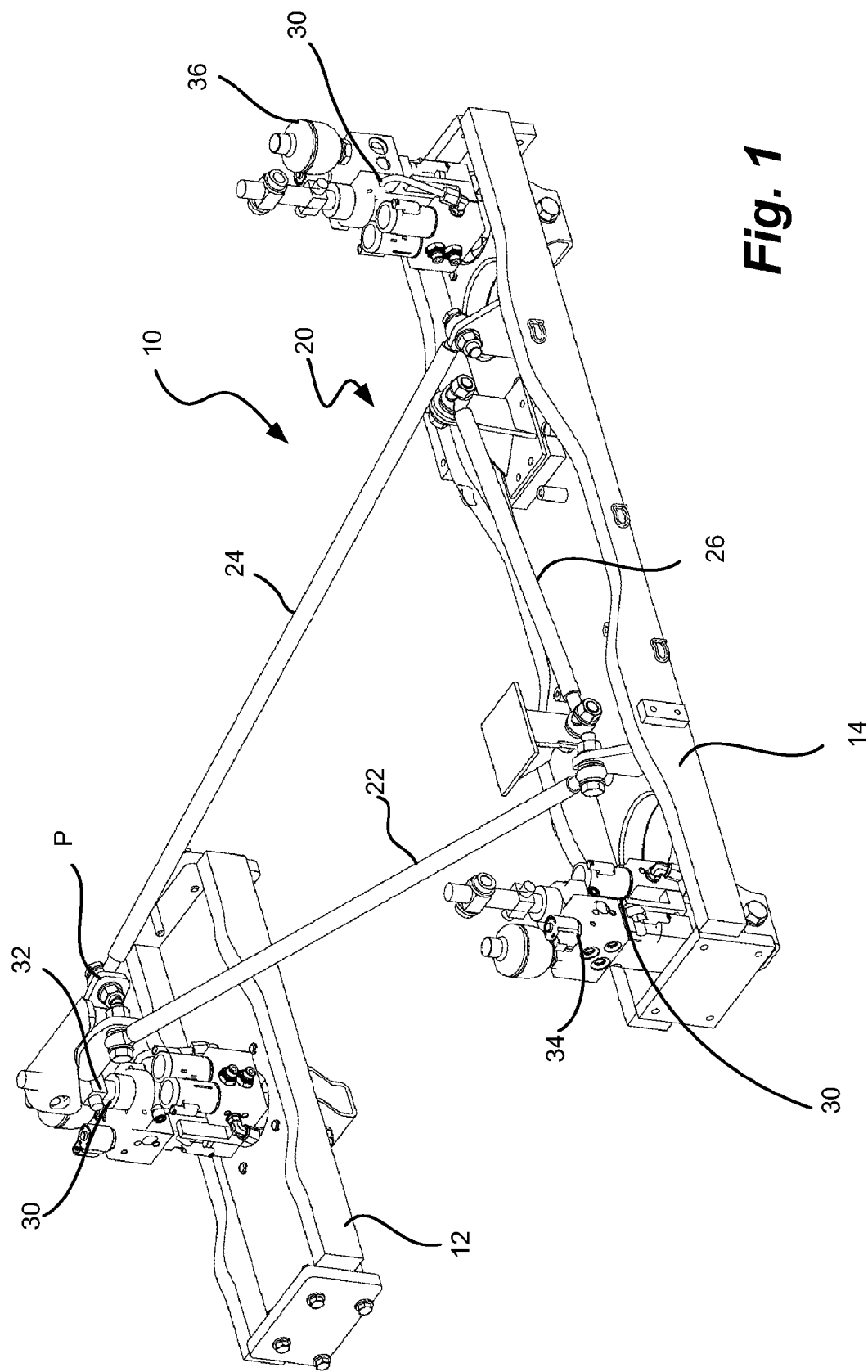
FIG. 1 illustrates a perspective view of a suspension system, in accordance with an exemplary embodiment of the present invention.
Figure 2:
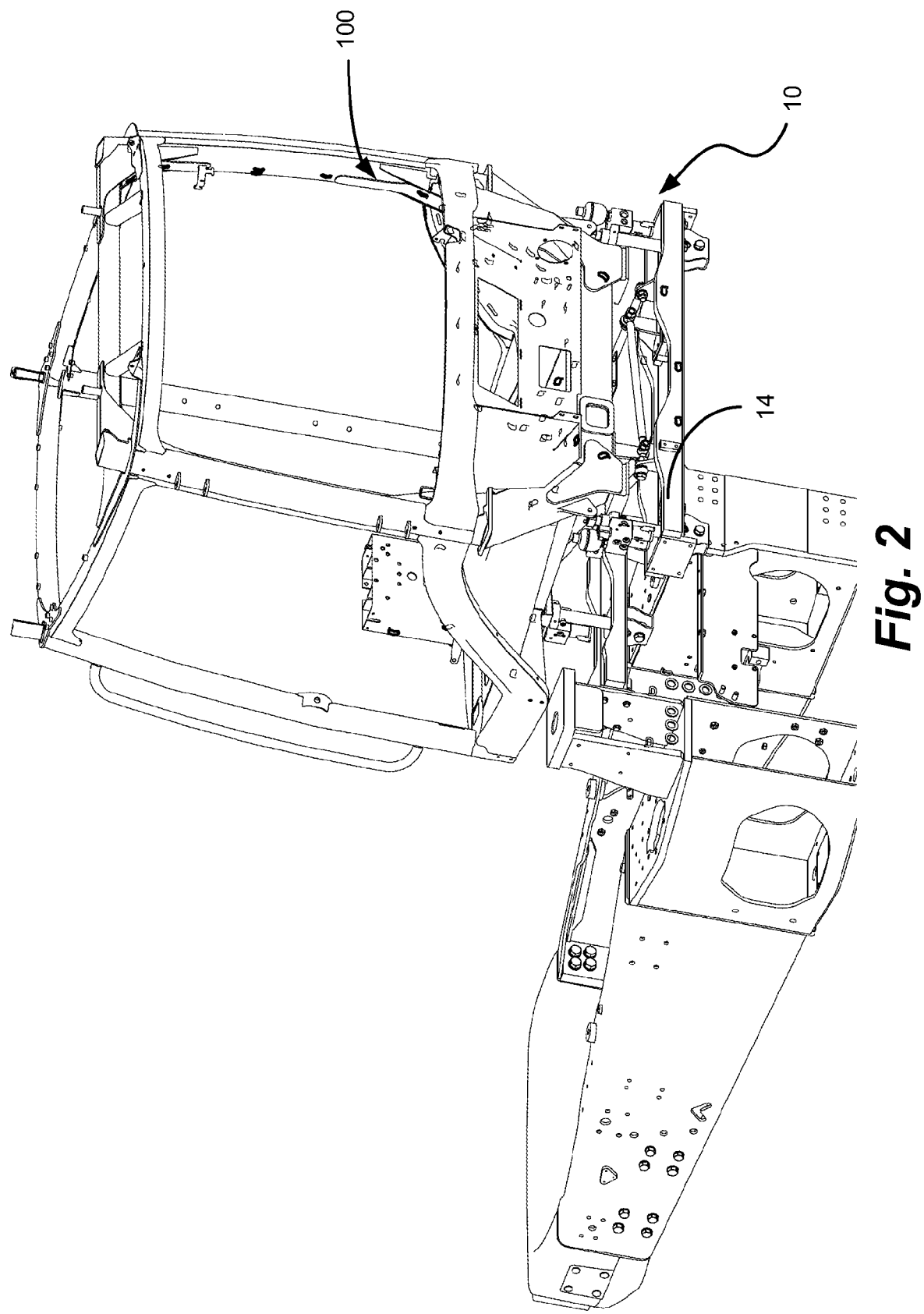
FIG. 2 illustrates a perspective view of the suspension system carrying a cab, in accordance with an exemplary embodiment of the present invention.
Figure 3:
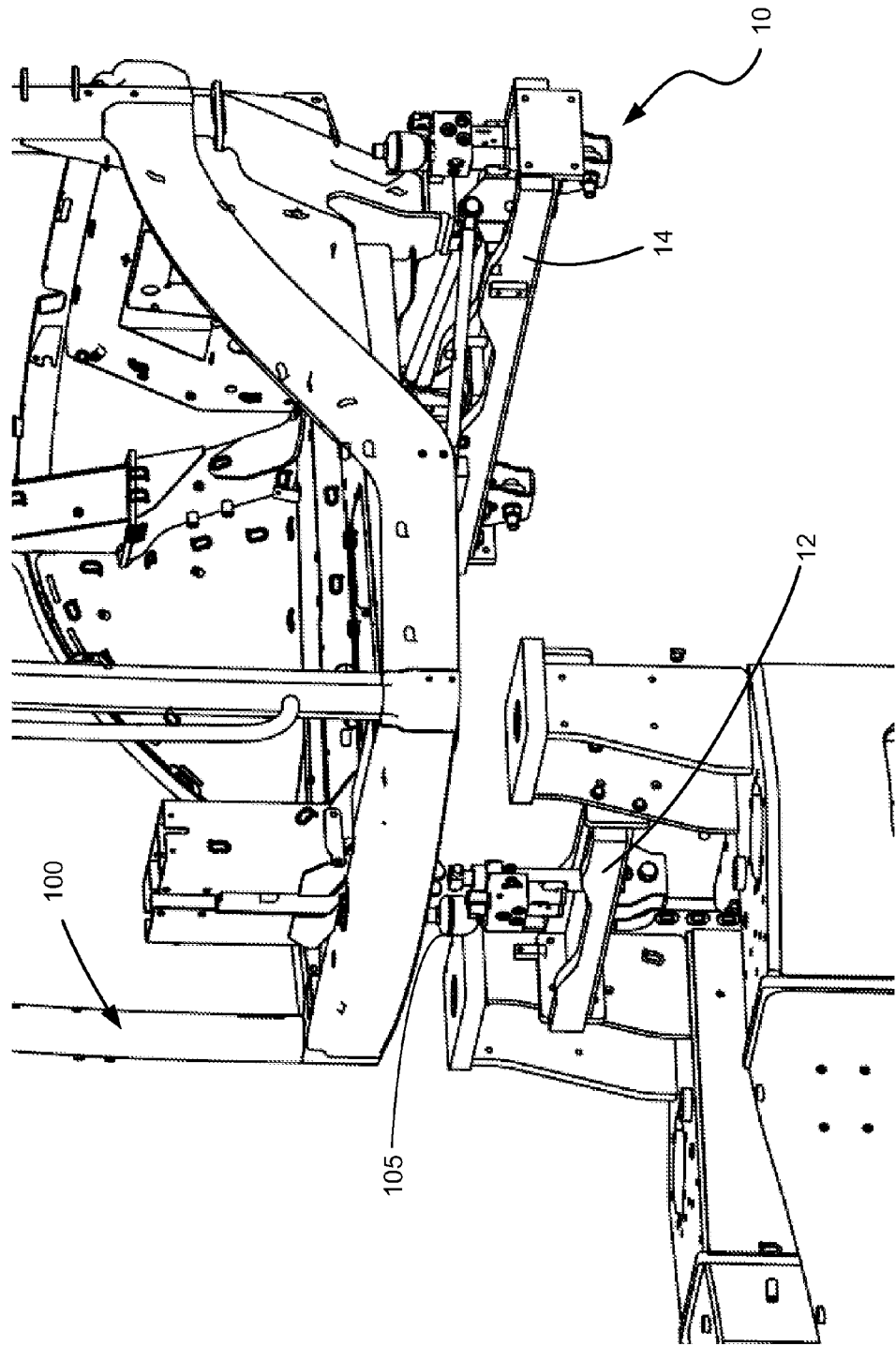
FIG. 3 illustrates another perspective view of the suspension system carrying the cab, in accordance with an exemplary embodiment of the present invention.
Figure 4:
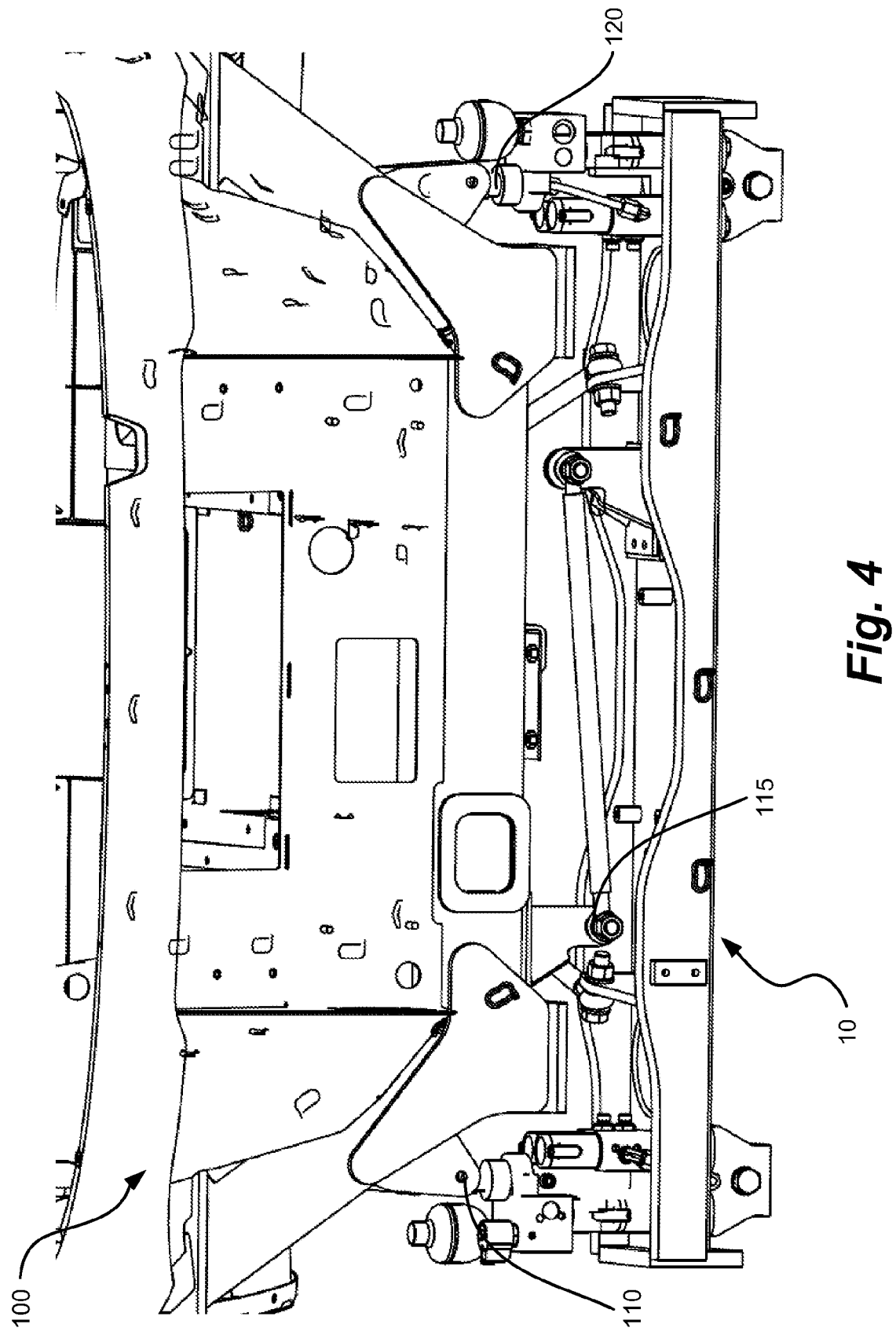
FIG. 4 illustrates a perspective view of a bottom portion of the cab carried by the suspension system, in accordance with an exemplary embodiment of the present invention.

Referring now in detail to the figures, FIG. 1 illustrates a perspective view of a suspension system 10 for a cab 100 (FIGS. 2-4). The suspension system 10 comprises a linkage assembly 20, including a first fore-aft linkage 22, and second fore-aft linkage 24, and a lateral linkage 26.

The suspension system 10 communicates between the first chassis section 12 and the second chassis section 14 of the tractor, providing suspension control of damping members 30, one 32 located at the front of the first chassis section 12, and two 34, 36 located at the rear of the first chassis section 12 and in communication with the second chassis section 14.

The first chassis section 12 of the tractor thus is supported by the three damping members 30, preferably hydraulic cylinders, each acting independently. The linkage assembly 20 uses the set of three linkages 22, 24, 26 to restrain the cab. The two fore-aft linkages 22, 24 are attached at the rear to the second chassis section 14 of the tractor, and at the front to the first chassis section 12. The linkages 22, 24 meet in the front at a single point P. The linkages are attached to the first chassis section 12 and the second chassis section 14 with rod end bearings allowing some movement as the first chassis section 12 moves.

The fore-aft linkages 22, 24 restrain the front of the first chassis section 12 from moving fore-aft and laterally. The linkages 22, 24 further enable the cab 100 to move and down, through an arc shape, without restraint. To restrain rotational movement, the rear lateral linkage 26 is provided.

It is desirable that the linkages 22, 24 be as close as possible to horizontal at the mid-stroke of the cylinders. As the linkages 22, 24 move up and down, the movable end of the linkage attached to the cab 100 moves in an arc. The arc actually forces the cab fore-aft. The amount of movement is dependent on how close to horizontal the linkages are in mid-stroke and their length. The longer the linkages 22, 24 are, the larger the arc diameter; therefore, the cab 100 moves fore-aft less. The closer to horizontal they are the lower the fore-aft movement. Notably, the same situation also applies to the rear linkage.

For example, at the mid-stroke of the first chassis section 12, the linkages 22, 24, 26 can lie in a plane generally horizontal. This arrangement of the linkage assembly 20 can minimize unwanted fore-aft, lateral and rotational movement of the first chassis section 12 as it moves up and down.

In one embodiment, the linkages 22, 24, 26 are Watts linkages, to further minimize fore-aft, lateral and rotational movement. In such an embodiment, the aft end of the first chassis section 12 would be able to move up and down relative to the first chassis section 12, but prevented from moving from side to side. In other words, the linkage allows pitching of the cab 100 relative to the first chassis section 12, but prevents yaw. A Watts link has a pivot point in its center, and a rod that runs to each side therefrom. This design eliminates the side to side motion of a panhard rod.

The damping members 30 can comprise a low rate mechanical or air spring in parallel with an active device such as an hydraulic actuator. Alternatively, an active air spring could be used alone.

The present linkage assembly 20 can be combined with other passive, semi-active or active suspension systems to improve ride quality and operator comfort. Such systems include vibration isolators mounted between the chassis and cab or seat. Passive systems use passive vibration isolators (e.g., rubber isolators, springs with friction, or viscous dampers) to damp vibrations with different isolators used to damp different frequencies. Rubber isolators can be used, for example, to damp high frequency vibrations and air bags used to damp low frequency vibrations. Performance of passive systems, however, is limited due to design compromises needed to achieve good control at resonance frequencies and good isolation at high frequencies.

Semi-active systems achieve control and isolation between the chassis and the cab by controlling a damper to selectively remove energy from the system in response to movement of the cab sensed by sensors.

Active systems use sensors to sense cab movement and a controller to generate control signals for an actuator, which applies a force to the cab to cancel vibrations transmitted to the cab by the chassis. The power needed to apply the force is supplied by an external source (e.g., hydraulic pump).

In an exemplary embodiment, the suspension system attenuates both low and high frequency vibrations between the chassis and cab. Attenuation of high frequency vibrations can decrease acoustic noise in the cab, decrease fatigue, and decrease vibration-induced mechanical faults. Attenuation of low frequency (e.g., less than 20 Hz) vibrations can decrease operator fatigue and improve vehicle operability. The attenuation of low frequency vibrations is particularly important because the resonant frequencies of the human body are typically below 20 Hz. For example, the human abdomen resonates at frequencies between 4-8 Hz, the head and eyes resonate at frequencies around 10 Hz, and the torso at 1-2 Hz. The actual frequency may vary with the particular individual.

Aspects of the cab 100 are illustrated in FIGS. 2-4. Specifically, aspects of the cab 100 being carried on the chassis sections 12, 14 are illustrated. FIG. 2 shows the cab 100 carried by the suspension system 10. FIG. 3 illustrates a connection point 105, where a front of the cab 100 is mounted to the suspension system 10. A bottom portion of the cab 100 is illustrated in FIG. 4. FIG. 4 illustrates connection points 110, 115, 120 where a rear of the cab 100 is mounted to the suspension system 10.

Numerous characteristics and advantages have been set forth in the foregoing description, together with details of structure and function. While the invention has been disclosed in several forms, it will be apparent to those skilled in the art that many modifications, additions, and deletions, especially in matters of shape, size, and arrangement of parts, can be made therein without departing from the spirit and scope of the invention and its equivalents as set forth in the following claims. Therefore, other modifications or embodiments as may be suggested by the teachings herein are particularly reserved as they fall within the breadth and scope of the claims here appended.

What is claimed is:

1. A suspension system for carrying a cab, the suspension system comprising:
   a chassis assembly comprising a first chassis section and a second chassis section;
   a linkage assembly comprising a first fore-aft linkage and a second fore-aft linkage for restraining movement of the first or second chassis sections, both the first and second fore-aft linkages coupled at a first end to the first chassis section and at a second end to the second chassis section;
   a lateral linkage for restraining rotational movement of the cab, the lateral linkage coupled laterally at a first end to the second chassis section and at a second end to the cab; and
   a dampener for damping motion between the cab and the chassis;
   wherein the distance between the first ends of the fore-aft linkages is substantially less that the distance between the second ends of the fore-aft linkages.

2. The suspension system of claim 1, the first and second fore-aft linkages comprise a double arm lever rotatably mounted to the first chassis section and two levers extending in opposite directions from the ends of the double arm lever to fixed pivot points.

3. The suspension system of claim 1, the first and second chassis sections of the chassis assembly adapted to receive first and second portions of a cab for carrying the cab.

4. The suspension system of claim 3, the linkage assembly attached to the cab via rod end bearings.

5. The suspension system of claim 1, further comprising a plurality of dampening members.

6. The suspension system of claim 5, the plurality of dampening members comprising hydraulic cylinders.

7. The suspension system of claim 5, the plurality of dampening members comprising a low rate mechanical bias member in parallel with respect to an active device.

8. The suspension system of claim 7, the active device comprising a hydraulic actuator.

9. The suspension system of claim 5, the plurality of dampening members comprising an air spring in parallel with respect to an active device.

10. The suspension system of claim 1, wherein the suspension system attenuates both low and high frequency vibrations between the chassis assembly and the cab.

11. An agricultural machine comprising:
    a cab sized to receive a user;
    a suspension system carrying the cab comprising:
    a chassis assembly comprising a first chassis section and a second chassis section;
    a linkage assembly comprising a first fore-aft linkage and a second fore-aft linkage for restraining movement of the first or second chassis sections, both the first and second fore-aft linkages coupled at a first end to the first chassis section and at a second end to the second chassis section; and
    a lateral linkage for restraining rotational movement of the cab, the lateral linkage coupled laterally at a first end to the second chassis section and at a second end to the cab; and
    a dampener for damping motion between the cab and the chassis;
    wherein the distance between the first ends of the fore-aft linkages is substantially less that the distance between the second ends of the fore-aft linkages.

12. The agricultural machine of claim 11, the first and second fore-aft linkages of the linkage assembly comprising at least one double arm lever rotatably mounted to the chassis assembly and at least two levers extending in opposite directions from the ends of the double arm lever to fixed pivot points.

13. The agricultural machine of claim 11, further comprising a plurality of dampening members.

14. The agricultural machine of claim 13, the plurality of dampening members comprising hydraulic cylinders, a low rate mechanical bias member in parallel with respect to an active device, or an air spring in parallel with respect to the active device.

15. The agricultural machine of claim 14, the active device comprising a hydraulic actuator.

16. The agricultural machine of claim 11, wherein the suspension system attenuates both low and high frequency vibrations between the chassis assembly and the cab.

* * * * *